United States Patent [19]
Furuya et al.

[11] Patent Number: 5,827,440
[45] Date of Patent: Oct. 27, 1998

[54] TEMPERATURE SENSOR FORMING DIE

[75] Inventors: Seiichi Furuya; Takashi Sakamaki; Hiroyuki Yamauchi, all of Tokyo, Japan

[73] Assignee: Niles Parts Co., Ltd., Japan

[21] Appl. No.: 711,940

[22] Filed: Sep. 4, 1996

[30] Foreign Application Priority Data

Sep. 6, 1995 [JP] Japan ................................ 7-254575

[51] Int. Cl.$^6$ ............................ B29C 33/14; B29C 33/76
[52] U.S. Cl. ............................. 249/91; 264/278; 425/117
[58] Field of Search ................................. 425/117, 577, 425/129.1; 264/272.15, 272.11, 275, 277, 278, 328.7; 249/91

[56] References Cited

U.S. PATENT DOCUMENTS

| | | | |
|---|---|---|---|
| 4,000,877 | 1/1977 | Shead et al. ........................ | 249/91 |
| 4,162,138 | 7/1979 | Byrne .................................. | 249/91 |

FOREIGN PATENT DOCUMENTS

| | | |
|---|---|---|
| 4-24032 | 2/1992 | Japan . |
| 6-129915 | 5/1994 | Japan . |

Primary Examiner—Angela Ortiz
Attorney, Agent, or Firm—Rader, Fishman & Grauer

[57] ABSTRACT

A temperature sensor forming method and forming die are provided which perform insert-forming of a temperature sensor with a minimum of processes and in a short time. The temperature sensor formed has a temperature sensing element 1 arranged in a predetermined position inside a resin case 2. The process does not leave traces of pins that would allow water to penetrate the interior of the case. The process comprises a first step of supporting the temperature sensing element 1 with first and second slide blocks 6c and 6g. The process comprises a second step of injecting a molten forming resin 2a into a forming die 6 and retracting the first slide block 6c by injection pressure while the temperature sensing element 1 is being supported by the second slide block 6g. The process comprises a third step of retracting the second slide block 6g while injecting the molten forming resin 2a into the forming die 6. The receiving area S1 of the first slide block 6c is larger than the receiving area S2 of the second slide block 6g.

10 Claims, 2 Drawing Sheets

TEMPERATURE SENSOR FORMING DIE

BACKGROUND OF THE INVENTION

1. Field of the Invention

The present invention relates to a forming method and forming die for a temperature sensor which is insert-formed with a resin.

2. Description of the Prior Art

A conventional sensor enclosed in a resin case is disclosed in Published Unexamined Japanese Utility Model Application No. H4-24032. In this conventional sensor, a case is formed beforehand and a resin is poured into the case to enclose a temperature sensing element.

Another conventional temperature sensor is disclosed in Published Unexamined Japanese Patent Application No. H6129915, which has been previously filed by the applicants of the present invention. This conventional temperature sensor will be explained with reference to FIG. 4 of the drawings. In FIG. 4, a temperature sensor is shown having a temperature sensing element 1, a resin case 2, and a stopper portion 3.

The temperature sensing element 1 is a thermistor, for example, and is connected to terminals 5 via parallel twin leads 4. These twin leads 4 comprise two lead wires 4a arranged in parallel with a predetermined gap therebetween. The twin leads 4 are integrated by being covered with a cover 4b, and provide a certain amount of rigidity with respect to injection molding pressure and outside force when set in a forming die. Also, the terminals 5 have connecting portions 5a for the lead wires 4a and positioning protrusions 5b for fixing the terminals 5 to the forming die.

The resin case 2 comprises nylon resin, for example. The resin case 2 is insert-formed around one end of the temperature sensing element 1, the twin leads 4 and the portions 5a and protrusions 5b of the terminals 5. The resin case 2 also forms a connector portion 2a exposing the other ends of the terminals 5 and integrally forms a stopper portion 3 in its outer wall.

The stopper portion 3 has a complicated shape, as shown in FIG. 4, and forms a flexible arm 3a and a regulating surface 3b. The regulating surface 3b regulates the amount of deformation of the flexible arm 3a. The flexible arm 3a abuts the regulating surface 3b when the rotational torque of the stopper portion 3 engaged with an installing member 7, for example, changes. The regulating surface 3b thereby limits the rotation of the stopper portion 3.

However, in the case of the above conventional techniques, it was necessary to have a process for enclosing the temperature sensing element with resin as well as a process for forming the case, and a long time was required for the resin enclosure. In this respect, the number of processes could be reduced if the temperature sensing element is insert-formed at the same time as the case is formed.

However, in order to arrange the temperature sensing element in a predetermined position in the case, it has been necessary to perform injection molding with the temperature sensing element supported by positioning pins, for example, and to perform corrective action of removing the pins after forming is completed. As a result, traces of the pins are left in the case, causing the problem of water penetrating into the interior of the case, thereby making it necessary to either limit the temperature sensor's application or to perform a process of filling in the traces.

SUMMARY OF THE INVENTION

The present invention has been made in order to solve the above-stated problems encountered in the conventional art.

It is therefore an object of the present invention to provide a forming method for a temperature sensor which, as well as performing insert forming with a minimum of processes and in a short time with a temperature sensing element arranged in a predetermined position inside a case, does not leave traces of pins which allow water to penetrate the interior of the case. The present invention improves the conventional technique disclosed in Published Unexamined Japanese Patent Application No. H6-129915 (described above) by improving the precision with which the temperature sensing element is disposed in a predetermined position inside the case and minimizing inconsistencies in the thermal response characteristic.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In order to solve the above problems according to a first aspect of the present invention, a temperature sensor forming method is provided comprising a first step of supporting a temperature sensing element by means of a first slide block and a second slide block, freely fitted in the center of the first slide block, of a forming die, a second step of injecting a molten forming resin into the forming die and retracting the first slide block by injection pressure while the temperature sensing element is supported by the second slide block, and a third step of retracting the second block while injecting the molten forming resin into the forming die.

In accordance with a second aspect of the present invention, a temperature sensor forming die for resin forming is provided, comprising a first slide block, a second slide block freely fitted in the center of the first slide block, and a temperature sensing element supported by the first slide block and the second slide block, wherein a receiving area in a sliding direction of the first slide block is set larger than a receiving area in a sliding direction of the second block with respect to a molten forming resin injected into a forming die, whereby only the first slide block is retractable by injection pressure when the molten forming resin is first injected into the forming die, while the temperature sensing element is being supported by the second sliding block.

Since the present invention forms a temperature sensor by means of the above forming method and forming die, it performs insert-forming with a minimum of processes and in a short time with a temperature sensing element arranged in a predetermined position inside a case, and does not leave traces of pins which allow water to penetrate the interior of the case. Also, it improves the precision with which the temperature sensing element is disposed in a predetermined position inside the case and minimizes inconsistencies in the thermal response characteristic.

BRIEF DESCRIPTION OF THE DRAWINGS

These and other features, aspects and advantages of the present invention will become better understood with reference to the following description, appended claims and accompanying drawings, wherein:

DETAILED DESCRIPTION OF THE INVENTION

Figure 1:
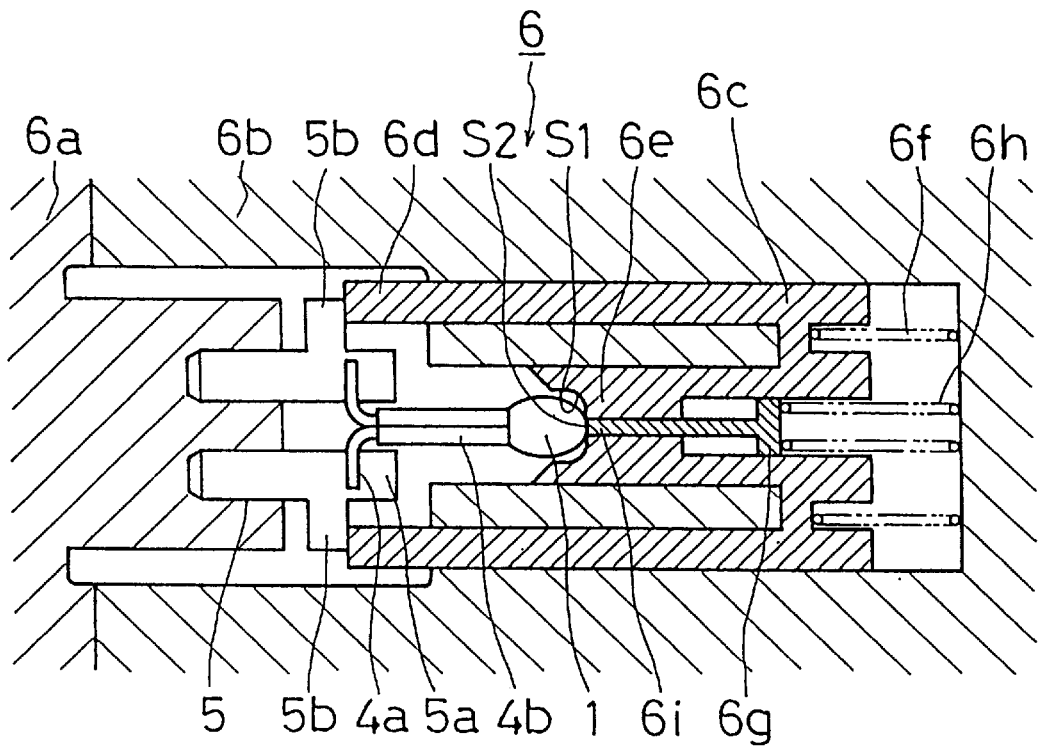
FIG. 1 is a cross-sectional view illustrating the first process of the present invention.
Figure 2:
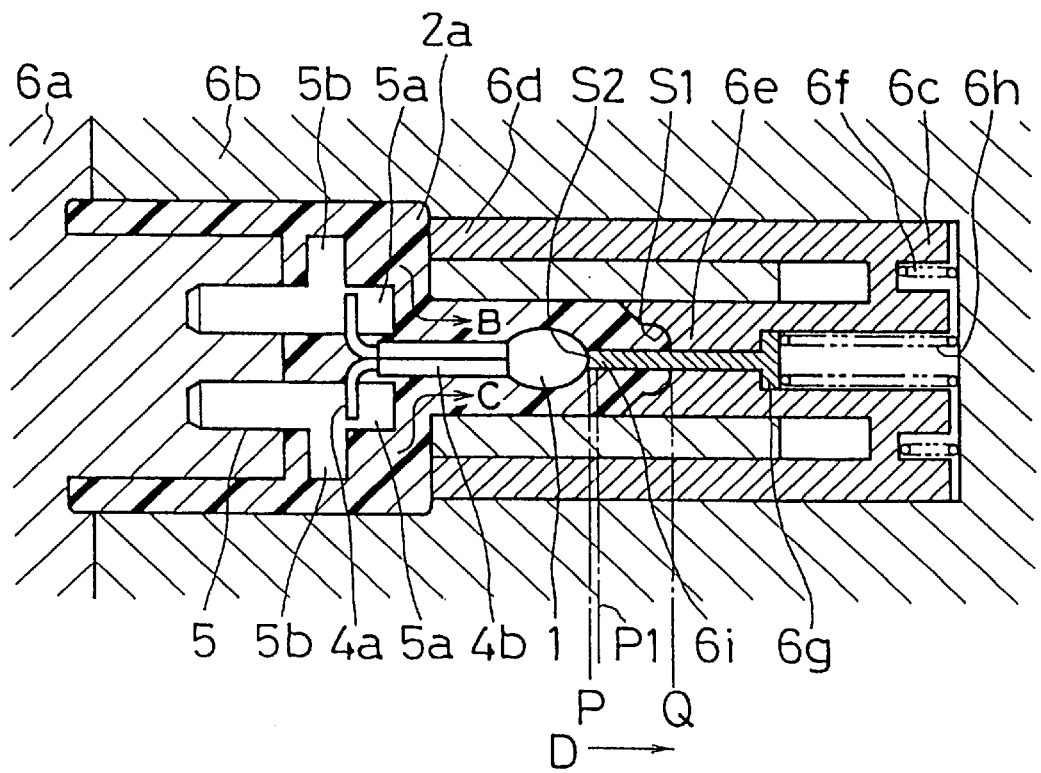
FIG. 2 is a cross-sectional view illustrating the second process of the present invention.
Figure 3:
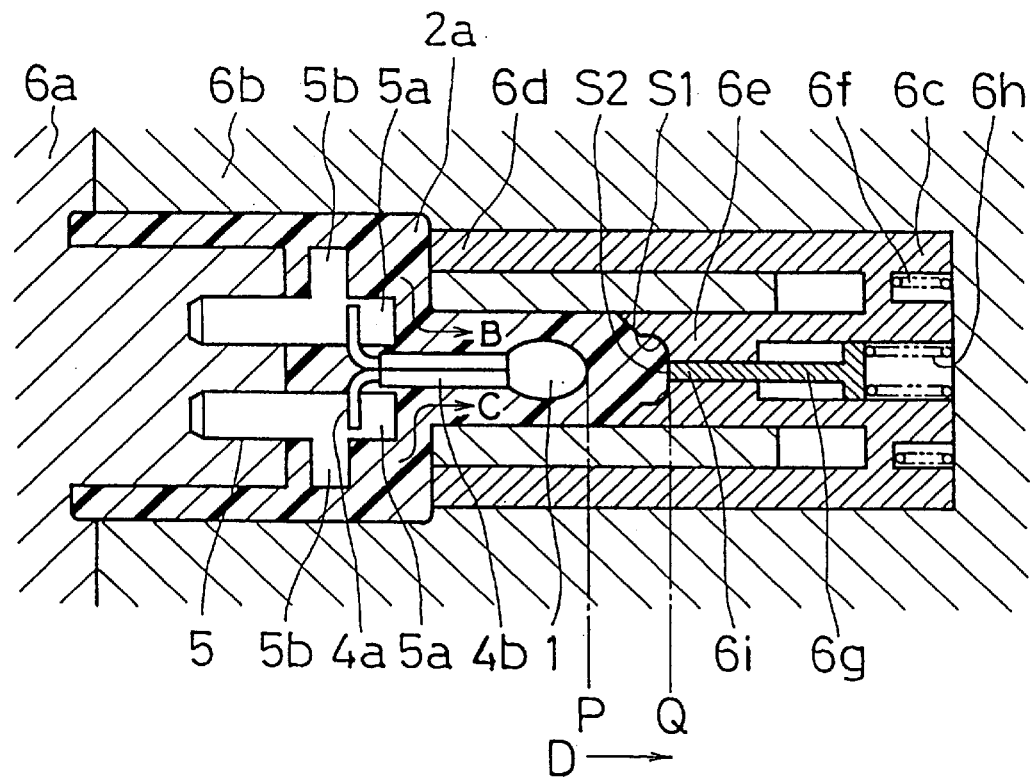
FIG. 3 is a cross-sectional view illustrating the third process of the present invention.

FIGS. 1 to 3 illustrate preferred embodiments of a forming method and forming die for a temperature sensor according to the present invention.

Figure 4:
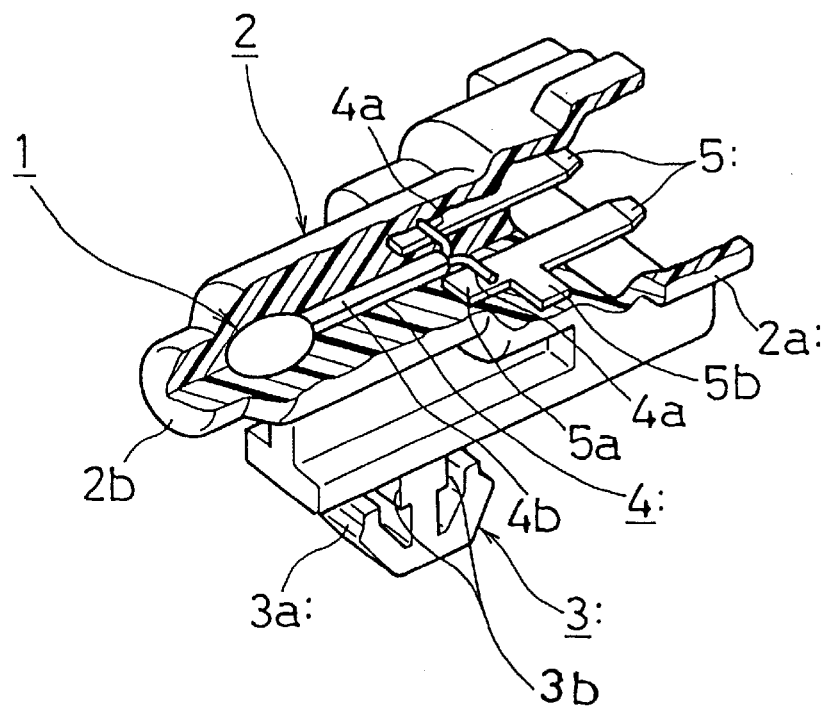
FIG. 4 is a perspective view showing a conventional temperature sensor.

It should be noted that a temperature sensor having the structure shown in FIG. 4 can be formed by the method and die according to FIGS. 1 to 3. In the following description of the present invention those components illustrated in FIG. 4 and having the same structures as in the prior art will be described using the same reference numbers, and detailed descriptions thereof will be omitted.

First, the process of insert-forming the temperature sensing element 1 in the resin case 2 using a forming die 6 will be sequentially described.

(1) First step: FIG. 1 shows a first step, illustrating a state wherein the temperature sensing element 1 is supported by a first slide block 6c of the forming die 6 and a second slide block 6g fitted in the center of the first slide block 6c. This forming die 6 is provided with a lower die 6a, an upper die 6b, the first slide block 6c, the second slide block 6g, and springs 6f and 6h. The first slide block 6c further comprises a first support portion 6d for the positioning protrusions 5b and a second support portion 6e for the temperature sensing element 1.

In setting the temperature sensing element 1 in the forming die 6, the terminals 5 are first inserted in the lower die 6a, then the lower die 6a is covered by the upper die 6b. At this time the terminals 5 are fixed by being sandwiched by the lower die 6a and the first support portion 6d of the first slide block 6c, and the temperature sensing element 1 is supported by being pushed by the rigidity of the twin leads 4 against the second support portion 6e of the first slide block 6c and a tip 6i of the second slide block 6g.

(2) Second step: FIG. 2 shows the second step following the first step, illustrating a state wherein the first slide block 6c is retracted due to the injection pressure of molten forming resin 2a.

The above molten forming resin 2a is pressure injected via a gate (not shown) into the space within the forming die 6 in which the temperature sensing element 1 is set. This pressure is known as injection pressure. The pressure injected forming resin 2a flows in the directions of the arrows B and C of FIG. 2, and soon thereafter the injection pressure operates the first slide block 6c. The first slide block 6c is retracted in the direction shown by the arrow D of FIG. 2.

In detail, the first slide block 6c is such that a receiving area S1 in the sliding direction with respect to the molten forming resin 2a injected into the forming die 6 is set larger than a receiving area S2 in the sliding direction of the second slide block 6g. As a result, in the initial step of injecting the molten forming resin 2a into the forming die 6, only the first slide block 6c can retract by means of the injection pressure while the second slide block 6g is supporting the temperature sensing element 1.

Thereby, the second support portion 6e of the first slide block 6c moves from position P to position Q shown in FIG. 2, and the molten forming resin 2a flows into this portion. At this time, the injection pressure of the molten forming resin 2a is in large part applied to the first slide block 6c whose receiving area S1 is relatively large until the forming resin 2a fills every part of the space of the forming die 6, as a result of which initially only the first slide block 6c is retracted. Therefore, the second slide block 6g supports the temperature sensing element 1 by way of its tip 6i.

(3) Third step: FIG. 3 shows the third step following the second step, illustrating a state wherein the second slide block 6g is retracted while the molten forming resin 2a is being injected into the forming die 6.

Upon the above molten forming resin 2a filling every part of the space in the forming die 6, the injection pressure of the molten forming resin 2a is strongly applied to the second slide block 6a whose receiving area S2 is relatively small. Immediately before the first slide block 6c finishes moving to position Q in the second step, the first slide block 6c engages with the second slide block 6a and the second slide block 6a moves slightly toward the position P1 from the position P shown in FIG. 2. As a result, a gap between the temperature sensing element 1 and the receiving area S2 portion of the second slide block 6a widens. The molten forming resin 2a penetrates into this gap and applies an injection pressure to the receiving area S2 portion. The injection pressure operates the second slide block 6a in the slide direction. As a result, the second slide block 6a is retracted from positions P and P1 to position Q subsequent to the retraction of the first slide block 6c.

In the case where the sequence that retracts the second sliding block 6a does not proceed well after only the first slide block 6c is retracted, the injection pressure in the third step may be increased over the injection pressure in the second step, i.e., the injection pressure may be modified in two stages. Of course it is also possible to retract the second slide block 6a using a negative pressure generating means, suitable drawing means, or the like.

It will be appreciated that the present invention is not limited to the exact construction and process steps that have been described above and illustrated in the accompanying drawings, and that various modifications and changes can be made without departing from the scope and spirit thereof. It is intended that the scope of the invention only be limited by the appended claims.

We claim:

1. A die assembly for resin forming a temperature sensor, comprising:

a die defining a space for receiving a molten forming resin;

a first slide block slidably fitted in said die;

a second slide block slidably fitted in a center of the first slide block, said second slide block being movable relative to both said first slide block and said die; and a temperature sensing element supported by the first slide block and the second slide block;

wherein a receiving area in a sliding direction of the first slide block is larger than a receiving area in a sliding direction of the second slide block with respect to a molten forming resin injected into the forming die, whereby only the first slide block is retractable by injection pressure when the molten forming resin is first injected into the forming die, while the temperature sensing element is being supported by the second slide block.

2. The die assembly according to claim 1, further comprising a first spring positioned between said die and said first slide block for biasing said first slide block toward said temperature sensing element.

3. The die assembly according to claim 2, further comprising a second spring positioned between said die and said second slide block for biasing said second slide block toward said temperature sensing element.

4. The die assembly according to claim 1, wherein said first slide block comprises means for engaging said second slide block and moving said second slide block away from said temperature sensing element prior to said second slide block being moved by injection pressure applied directly to a receiving area of said second slide block.

5. A die assembly for resin forming a temperature sensor, comprising:
- a lower die having means for receiving terminals of a temperature sensing element;
- an upper die for cooperating with said lower die to define a space for receiving a molten forming resin;
- a first slide block slidably fitted in said upper die; and
- a second slide block slidably fitted in said first slide block, said second slide block being movable relative to both said upper die and said first slide block, said first and second slide blocks each having a portion for engaging and supporting a temperature sensing element;
- wherein an injection pressure receiving area in a sliding direction of the first slide block is larger than an injection pressure receiving area in a sliding direction of the second slide block, whereby said first slide block is caused to move out of engagement with said temperature sensing element by injection pressure sequentially before said second slide block is caused to move out of engagement with said temperature sensing element.

6. The die assembly for resin forming a temperature sensor according to claim 5, further comprising a first spring positioned between said upper die and said first slide block for biasing said first slide block toward said temperature sensing element.

7. The die assembly for resin forming a temperature sensor according to claim 6, further comprising a second spring positioned between said upper die and said second slide block for biasing said second slide block toward said temperature sensing element.

8. The die assembly for resin forming a temperature sensor according to claim 5, wherein said first slide block comprises a means for engaging said second slide block and moving said second slide block away from said temperature sensing element prior to said second slide block being moved by injection pressure applied directly to a receiving area of said second slide block.

9. The die assembly according to claim 1 wherein said first slide block comprises a first recess for receiving a first spring and a second recess for receiving a second spring, said first spring engaging and biasing said first slide block toward said temperature sensing element, and said second spring engaging and biasing said second slide block toward said temperature sensing element.

10. The die assembly for resin forming a temperature sensor according to claim 5, wherein said first slide block comprises a first recess for receiving a first spring and a second recess for receiving a second spring, said first spring engaging and biasing said first slide block toward said temperature sensing element, and said second spring engaging and biasing said second slide block toward said temperature sensing element.

* * * * *